Patented July 6, 1926.

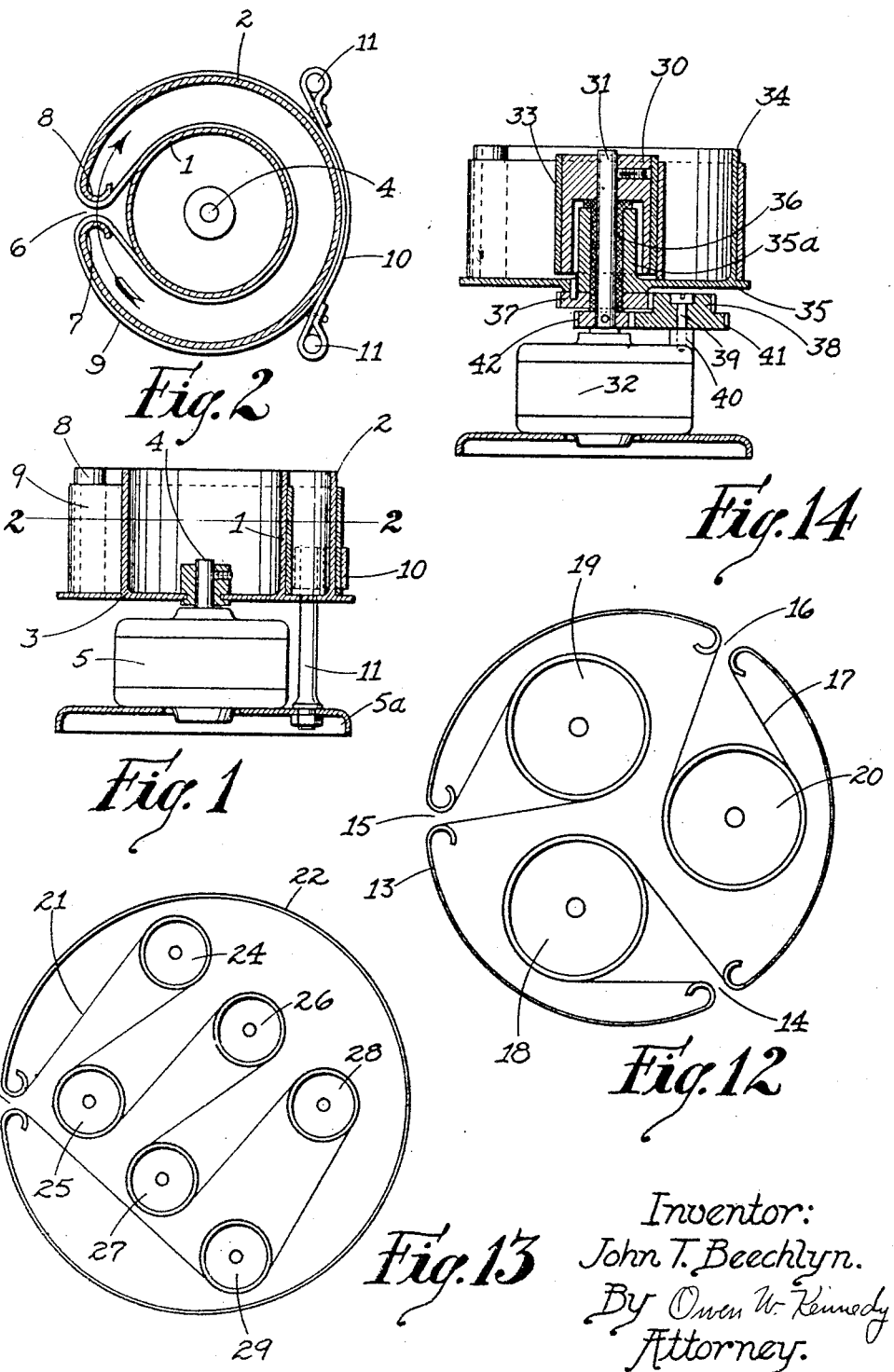

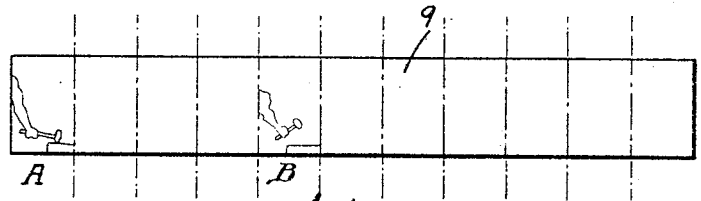
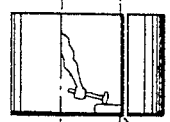
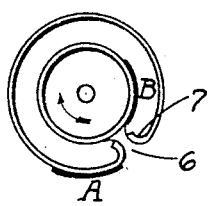
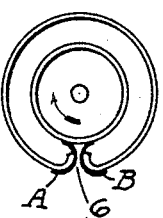
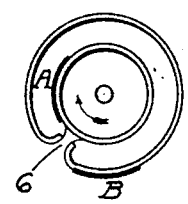
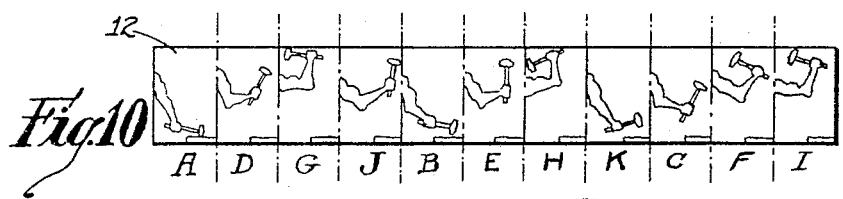
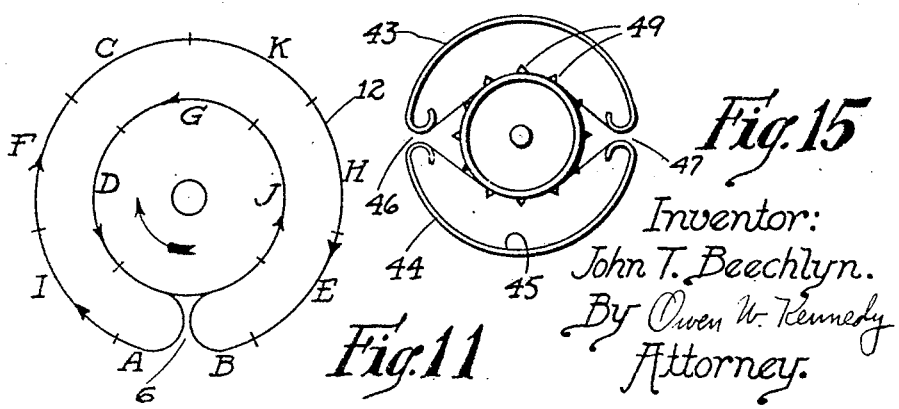

BEST AVAILABLE COPY 1,591,737

UNITED STATES PATENT OFFICE.

JOHN T. BEECHLYN, OF WORCESTER, MASSACHUSETTS, ASSIGNOR TO STORY AND BEECHLYN, OF WORCESTER, MASSACHUSETTS, A COPARTNERSHIP CONSISTING OF WILLIAM E. STORY, JR., AND JOHN T. BEECHLYN.

METHOD OF AND DEVICE FOR ANIMATED PICTURE DISPLAY.

Application filed November 20, 1922. Serial No. 602,146.

My invention relates to an improved method of and device for displaying a series of pictures showing an object in different positions, in such a manner that the object appears to be in motion. The purpose of my invention is to provide a device of the character indicated, in which the picture or pictures may be viewed like any still picture, by the light falling directly on it. The manner in which my purpose is accomplished, and the results obtained, differ in many important respects from animated picture display devices which have been heretofore employed.

I am aware that devices for displaying a series of different pictures in such a manner that an object appears to be in motion, have been heretofore constructed, and one form of such a device is found in the so-called Zoetrope. In the Zoetrope, successive pictures of a series are fastened to the inside of a black rotating drum, and are admitted to instantaneous view through a corresponding series of slots provided in the drum at a higher level than the pictures. When the drum is rotated, the different pictures of the series appear at intervals to the observer through the slots, and the object appears to be in motion. The practical use of the Zoetrope however, is very much limited by a number of defects inherent in the device because of its mode of operation. In the first place, the observing slots must be quite narrow relative to the obscuring intervals, so that the observer sees the picture but a small part of the time. In the second place, the intermittent viewing of the pictures results in an objectionable flicker, and it also follows that the pictures do not appear as bright as if they were viewed continuously. In addition, the difficulty of obtaining a well illuminated picture is further increased by the fact that the pictures of the series are located inside the drum. A still further disadvantage of the Zoetrope is that the pictures may be viewed only within a narrow zone, in which the eye of an observer is in alinement with the series of slots and the pictures.

By my present invention I propose to eliminate all of the above described objectionable features of the Zoetrope device, by presenting each picture of the series stationary on the outside of my device until the next picture of the series is ready to take its place. Each picture of the series is therefore illuminated by the light falling on it from any direction, and furthermore the depicted action is completely visible at any point removed from the device not directly above or below. During the period of transition between different pictures of a series, while one picture is being withdrawn from view and the next substituted for it, the pictures appear to merge into each other without intermittent movement and without appreciable blurring or flicker, owing to the fact that complementary portions of both pictures, involved in the substitution are displayed in proper relation. In fact, so inappreciable do these faults become, that the number of any pictures presented in any given period of time may be very materially reduced from the number of consecutive pictures that are usually presented during the same time interval in accordance with standard motion picture practice. The above, and other advantageous features will hereinafter more fully appear, reference being had to the accompanying drawings in which—

Fig. 1 is a view, partially in section and partially in side elevation, of a device illustrating an elementary form of my invention.

Fig. 2 is a horizontal sectional view along the line 2—2, Fig. 1.

Fig. 3 is a developed view of the picture band employed in the device shown in Figs. 1 and 2, with a portion of the figures thereon.

Figs. 4 and 5 are diagrammatic views illustrating the appearance of the band for a given phase of operation of the device shown in Fig. 1.

Figs. 6 and 7 are diagrammatic views similar to Figs. 4 and 5, illustrating the appearance of the band for another phase of operation of the device.

Figs. 8 and 9 are diagrammatic views illustrating the appearance of the band for a third phase of operation of the device.

Fig. 10 is a developed view of a picture band with all of its figures thereon.

Fig. 11 is a diagrammatic view showing the band of Fig. 10 applied to my device.

Figs. 12 and 13 are diagrammatic views illustrating modifications in the manner of applying the picture band to my device.

Fig. 14 is a view similar to Fig. 1, showing a modification of the driving mechanism of my device.

Fig. 15 is a diagrammatic view showing a still further modification of my device.

Like reference characters refer to like parts in the different figures.

Referring first to Figs. 1 and 2, an elementary form of my device consists essentially of spaced concentric cylinders or drums 1 and 2, which are mounted on a plate 3, the exterior surfaces of the drums 1 and 2 being highly polished so as to present a minimum amount of frictional resistance to anything in contact therewith. The plate 3 is secured to the shaft 4 of an electric motor 5, and is adapted to rotate therewith, so that both drums 1 and 2 are adapted to revolve in unison about the axis of the motor shaft 4.

As best shown in Fig. 2, the outer cylinder 2 is provided with a vertical slot 6, the edges of which are turned back and rounded to provide lips 7 and 8. A band 9 of flexible material, such as cloth, paper or celluloid, extends around the periphery of the outer drum 2, through the slot 6, and around the inner drum 1, the lips 7 and 8 guiding the band 9 in an easy path from the drum 2 to the drum 1. A braking member 10 extends between posts 11 carried by the motor base 5ª, and is in engagement with the outer surfaces of the band 9 so as to apply a frictional force thereto.

From the preceding description of the mechanism shown in Figs. 1 and 2, it is apparent that when the motor 5 is operated, the plate 3 will be rotated and cause the drums 1 and 2 to revolve about the axis of rotation of the shaft 4. As the drums 1 and 2 move, the braking member 10, in engagement with the band 9, prevents that portion of the band 9 on the outer drum 2, from moving. At the same time however, the lip 7 at one side of the slot 6 will move in the direction of rotation of the motor shaft 4, as indicated by the arrow, the band 9 permitting this movement because any tension in the band between the lip 7 and the outer surface of the inner drum 1, will be constantly relieved by the recession of the other lip 8, the band 9 slipping freely over the surface of the inner drum 1. In this manner, rotation of the drums 1 and 2 by the motor 5, will cause the band 9 to be withdrawn from the outer drum 2, all portions of the band so withdrawn, being replaced by portions from the inner drum 1.

Referring now to Fig. 3, the band 9 is shown as being removed from the device and spread out. For facility of explanation let it be assumed that the band is divided up into a number of equal spaces, it being understood that such division is not essential to the operation of the device, and I do not in any way limit the scope of my invention by this assumption. In space A, then, let there be for example the picture of the arm of a man in the act of striking an anvil with a hammer. In another space B let there be a similar picture except that the arm is now shown with the hammer slightly raised from the anvil.

Referring now to Figs. 4 and 5, the band 9 is shown as having been applied to the drums 1 and 2, the proportions of which are such that when the space A is fully visible from a point directly in front of the device, the edge of the space B is just within the lip 7 of the slot 6.

Let it now be assumed that the drums 1 and 2 are rotated in the direction of the arrow, as illustrated in Figs. 6 and 7, and that the member 10 is in engagement with the band 9. As the lip 7 advances, it will cause the space B with its picture, to be drawn out on the periphery of the outer drum 2, while the receding lip 8 will allow the space A with its picture, to be withdrawn from the outer loop of the band. At the moment when the slot 6 is in line with the observer's position O and the axis of rotation of the drum, the pictures will appear substantially as shown in Figs. 6 and 7. From an inspection of Figs. 6 and 7, it is apparent that as portions of the picture A disappear from view, corresponding portions of the picture B will emerge from the slot to take the place of those portions of picture A which have disappeared, so that any time during this transition a complete picture, except for a narrow region at the slot 6 itself, is formed by the visible parts of both pictures taken together. The passage of the slot then brings about a progressive substitution of one picture for the other, and it is apparent that if the two pictures are of two figures similar in all respects, except for slight differences in the relative positions of certain portions thereof, such as the limbs, the first picture will appear to change without having apparently been withdrawn from the view of the observer. The transition between the pictures will be complete when the slot 6 occupies the position shown in Figs. 8 and 9, in which position the picture represented by the space B will be fully exposed to the eye of the observer.

Before proceeding any further with the

Figs. 8 and 9 are diagrammatic views illustrating the appearance of the band for a third phase of operation of the device.

Fig. 10 is a developed view of a picture band with all of its figures thereon.

Fig. 11 is a diagrammatic view showing the band of Fig. 10 applied to my device.

Figs. 12 and 13 are diagrammatic views illustrating modifications in the manner of applying the picture band to my device.

Fig. 14 is a view similar to Fig. 1, showing a modification of the driving mechanism of my device.

Fig. 15 is a diagrammatic view showing a still further modification of my device.

Like reference characters refer to like parts in the different figures.

Referring first to Figs. 1 and 2, an elementary form of my device consists essentially of spaced concentric cylinders or drums 1 and 2, which are mounted on a plate 3, the exterior surfaces of the drums 1 and 2 being highly polished so as to present a minimum amount of frictional resistance to anything in contact therewith. The plate 3 is secured to the shaft 4 of an electric motor 5, and is adapted to rotate therewith, so that both drums 1 and 2 are adapted to revolve in unison about the axis of the motor shaft 4.

As best shown in Fig. 2, the outer cylinder 2 is provided with a vertical slot 6, the edges of which are turned back and rounded to provide lips 7 and 8. A band 9 of flexible material, such as cloth, paper or celluloid, extends around the periphery of the outer drum 2, through the slot 6, and around the inner drum 1, the lips 7 and 8 guiding the band 9 in an easy path from the drum 2 to the drum 1. A braking member 10 extends between posts 11 carried by the motor base 5ª, and is in engagement with the outer surfaces of the band 9 so as to apply a frictional force thereto.

From the preceding description of the mechanism shown in Figs. 1 and 2, it is apparent that when the motor 5 is operated, the plate 3 will be rotated and cause the drums 1 and 2 to revolve about the axis of rotation of the shaft 4. As the drums 1 and 2 move, the braking member 10, in engagement with the band 9, prevents that portion of the band 9 on the outer drum 2, from moving. At the same time however, the lip 7 at one side of the slot 6 will move in the direction of rotation of the motor shaft 4, as indicated by the arrow, the band 9 permitting this movement because any tension in the band between the lip 7 and the outer surface of the inner drum 1, will be constantly relieved by the recession of the other lip 8, the band 9 slipping freely over the surface of the inner drum 1. In this manner, rotation of the drums 1 and 2 by the motor 5, will cause the band 9 to be withdrawn from the outer drum 2, all portions of the band so withdrawn, being replaced by portions from the inner drum 1.

Referring now to Fig. 3, the band 9 is shown as being removed from the device and spread out. For facility of explanation let it be assumed that the band is divided up into a number of equal spaces, it being understood that such division is not essential to the operation of the device, and I do not in any way limit the scope of my invention by this assumption. In space A, then, let there be for example the picture of the arm of a man in the act of striking an anvil with a hammer. In another space B let there be a similar picture except that the arm is now shown with the hammer slightly raised from the anvil.

Referring now to Figs. 4 and 5, the band 9 is shown as having been applied to the drums 1 and 2, the proportions of which are such that when the space A is fully visible from a point directly in front of the device, the edge of the space B is just within the lip 7 of the slot 6.

Let it now be assumed that the drums 1 and 2 are rotated in the direction of the arrow, as illustrated in Figs. 6 and 7, and that the member 10 is in engagement with the band 9. As the lip 7 advances, it will cause the space B with its picture, to be drawn out on the periphery of the outer drum 2, while the receding lip 8 will allow the space A with its picture, to be withdrawn from the outer loop of the band. At the moment when the slot 6 is in line with the observer's position O and the axis of rotation of the drum, the pictures will appear substantially as shown in Figs. 6 and 7. From an inspection of Figs. 6 and 7, it is apparent that as portions of the picture A disappear from view, corresponding portions of the picture B will emerge from the slot to take the place of those portions of picture A which have disappeared, so that any time during this transition a complete picture, except for a narrow region at the slot 6 itself, is formed by the visible parts of both pictures taken together. The passage of the slot then brings about a progressive substitution of one picture for the other, and it is apparent that if the two pictures are of two figures similar in all respects, except for slight differences in the relative positions of certain portions thereof, such as the limbs, the first picture will appear to change without having apparently been withdrawn from the view of the observer. The transition between the pictures will be complete when the slot 6 occupies the position shown in Figs. 8 and 9, in which position the picture represented by the space B will be fully exposed to the eye of the observer.

Before proceeding any further with the discussion of my invention, I wish to emphasize at this point the fact that the period of time occupied by the substitution of picture B for picture A is very small, since the drum is ordinarily rotated at the rate of a considerable number of turns per second, and also since the time taken for the passage of the slot 6 through the space A forms but a small portion of the time taken for a single turn. For this reason the ordinary observer is not aware that a substitution has taken place since the picture has remained apparently stationary all the time, and the momentary dimming of any point on the picture by the slot is imperceptible.

After picture A has been completely replaced by picture B, the latter remains stationary and undisturbed until the slot 6, after completing its rotation, again nears the line of sight between the observer and the axis of rotation of the device. At this point the original picture A may be caused to emerge from the slot, or a third picture may be caused to appear if this third picture is situated on the band 9 in the same relation to picture B as picture B bears to picture A. In order to illustrate more clearly the manner in which a third, fourth, or other succeeding pictures may be caused to come into the line of vision of the operator, I have shown in Fig. 10, a band 12, in which a series of pictures is indicated as running from A to K inclusive. Fig. 11 shows the band 12 applied to the drums, and arranged in such a manner that each picture will be replaced on the outside of the drum by a picture bearing the next higher letter of the alphabet, in other words, A will be replaced by B, I by J, F by G, C by D, K by A, etc., until A is again replaced by B on a different part of the drum, whereupon the series starts all over again.

In the foregoing the term "picture" has been employed for convenience, but it is obvious that the display need not be one of delineated figures, but can involve many other distinguishing characterizations of the several spaces, such as for instance that of color, tone or texture, and this general meaning of the word is implied throughout this specification.

In order that each space may take up the exact position of the space it replaces, I have found that the peripheral length of the drum 2 must be an integral number of space widths. Furthermore, if the spaces are all to replace each other in turn, the above integer and the total number of spaces on the band must have no common divisor greater than unity. The distance between any point in a given space, and the corresponding point in the space which replaces it, measured along the band in the direction of rotation of the drum, is obviously equal to the periphery of the drum. Under these conditions, if the pictures A—K represent successive phases of the motion of some object, the drum 2 will appear to have around its surface a row of pictures, in each of which the object appears to go through the entire motion represented by the picture elements, the phase of the motion in the different spaces around the drum being different.

For purposes of illustration, I have shown the band 12 to be eleven times the space width, while the peripheral length of the outer drum 2 is seven times the space width. The distance between the middle of space A and the middle of space B is the exact periphery of the outer drum 2, and also the distance between the middle of space B and the middle of space C, measured along the band 12 in the direction of the small arrows, is equal to the periphery of the outer drum. As already stated, the assumed division of the band into spaces, and the rule for determining the length of the band and number of pictures, has been introduced here principally to facilitate the understanding of the invention. This rule, while useful in some cases, cannot always be applied, as for instance where it is desired to show the continued progression of an object in one direction around the drum, as in the case of a travelling horse or the like. To obtain an effect of this kind, it may be advantageous to add to or substract from the number of pictures that normally would occupy a band of given length, or even to increase or decrease the length of the band and the pictures thereon from that determined in accordance with the given rule.

In the form of the device which has been described, a single slot only in the outer drum, has been considered. With the number of transitions per second ordinarily required to secure smoothness of the depicted action, and which in this case equals the number of turns per second of the drum, the necessary peripheral speed of the drum is entirely practical where the diameter is such as would be used in a device to be viewed at a distance of a few feet. In embodying my invention in displaying devices in which the drums are of larger size, as would be desirable in an advertising device to be viewed from a considerable distance, it is apparent that it would be necessary to drive the drums at a high peripheral speed greater than is practical in order to obtain the required number of picture transitions within a given period of time. Where it is desired to employ drums of large diameter, I propose therefore to provide the outer drum with a number of slots, as indicated in Fig. 12, so that there will be two or more picture transitions for each revolution of the drums. In this modification of my invention the outer drum 13 is provided with a number of slots 14, 15 and 16, each having turned in lips, and the band 17 is adapted to pass around a number of inner drums 18, 19 and 20, corresponding in number to the number of slots 14, 15 and 16. The distance between any picture and the picture by which it is replaced, measured along the band, in the direction opposite to the drum rotation, is the difference between the length of the band and the periphery of the drum divided by the number of slots. It will be observed that the rule previously given for a band to be used with a single slot is a special case of the above.

Where it is desired to show an action of considerable duration by employing a large number of consecutive pictures without reducing the scale of the pictures too much, it becomes necessary either to increase the diameter of the drum and the number of pictures exposed thereon, or to dispose of the extra length of band within the drum by passing it over a necessary number of idler drums. Such an arrangement is illustrated in Fig. 13, where the band 21 entering the outer drum 22 through the slot 23, is shown passed over a plurality of inner drums 24 to 29 inclusive.

In the several forms of my device described thus far, it has been assumed that the band on the outer drum has been kept stationary by frictional engagement with a stationary member. It is evident however, that if by any means, the band is caused to be drawn through the slot in the outer drum, with a speed equal to that of the periphery of the drum, the previous result will be obtained. I have found that this movement of the band through the slot can be accomplished by rotating the inner drum at a higher rate of speed than the outer drum, the inner drum being covered with some frictional material such as rubber or felt, on which the band will not slip. Such an arrangement is shown in Fig. 14, in which the inner drum 30 is attached to the shaft 31 of an electric motor 32, the periphery of the drum 30 being covered with a layer of frictional material 33. The outer drum 34 is carried on a plate 35 having a hub 35ᵃ which is free to rotate on a bearing sleeve 36, surrounding the shaft 31. A gear 37 is provided on the plate 35 and is in mesh with a pinion 38 mounted on a stud 39 carried by a lug 40 on the motor frame. The pinion 38 is adapted to turn with a gear 41 which is in mesh with a pinion 42 mounted on the motor shaft 31. Rotation of the motor shaft is adapted to directly drive the inner drum 30 at the same speed as the motor shaft, while the outer drum 34 will be simultaneously driven at a speed less than that of the inner drum 30, through the above described gearing. I have found that the ratio between the speed of the outer drum and the speed of the inner drum may be determined by the following formula;

$$R = \frac{D}{d} + 1,$$

where R is the gear ratio, D is the diameter of the outer drum, and $d$ the diameter of the inner drum. If the speed ratio be chosen in accordance with the above formula, that portion of the band on the outside of the outer drum will remain stationary without the application of frictional force thereto. A gear ratio at variance with the rule given above is useful in some cases where it is desired not to keep the band on the periphery of the outer drum entirely stationary, as for example, in the representation of an object moving around the drum. In this way a truly continuous progression of the band and portrayed elements can be obtained differing from the intermittent or step-by-step motion obtained by changing the width or number of the pictures as previously described. All of these methods may be used singly or in combination.

It is obvious that with the arrangement shown in Fig. 14, the movement of the band by the inner drum can be obtained by a positive drive, such as projecting teeth on the drum cooperating with perforations in the edge of the band. In this way, the relation between the various speeds of the drums with respect to the band, can be absolutely maintained. When a positive drive, such as that mentioned above, is used between band and inner drum, it becomes quite practical to employ several bands, each of which is displayed on different arcs of the outer drum. An example of this form of my device is shown in Fig. 15, wherein bands 43 and 44 each extend partially around an outer drum 45 having slots 46 and 47. An inner drum 48 is provided with peripheral teeth 49 which are received in perforations provided along the edges of the bands 43 and 44. In this case it is evident that as a picture on one band is withdrawn, the picture that replaces it is one belonging to the other band. This means that succeeding phases of action must be represented alternately on each of the two bands.

From the foregoing then, it is apparent that by my invention I have provided an improved device for displaying a series of pictures or portrayals in such a manner that the subjects portrayed appear to undergo change. My device is believed to be distinguishable from prior devices in fundamental principles, my device being characterized by the fact that the pictures are always illuminated by the light falling on them from any direction, and by the additional fact that any picture under direct observation, is always completely in sight of the observer, and that the substitution of one picture for another takes place without obscuration and occurs so quickly and smoothly that the period of transition is practically imperceptible. As a result, my device is to an extraordinary degree free from flickering and poor illumination, which has characterized previous devices.

My device is believed to have a wide field of practical application in that it is sure to attract the attention of any observer anywhere that it may be placed. It is believed that my device will have a wide use for advertising purposes and that it will be equally effective either when built on a small scale, as for window displays, or on a large scale for use on a building or any other location where the observers will be considerably removed from the device itself.

While I have shown my device as being embodied in several specific forms, it is obvious that my invention is not so limited, but that the principles underlying my invention may be applied to other devices without departing from the spirit and scope of my invention. I desire therefore that only such limitations be imposed thereon as may come within the scope of the appended claims.

I claim:—

1. In a display device of the class described, a carrier having a series of pictures thereon representing successive phases of an action, means for presenting said carrier with the pictures in direct view, and means for flexing the carrier to bring about a series of transitions each affecting successively displayed pictures of the series and with each transition involving the propagation across the surface of picture presentation of a progressive substitution of one picture for another with complementary material portions of both pictures contiguous to the zone of picture flexures in proper relation.

2. In a display device of the class described, a carrier having a series of pictures thereon representing successive phases of an action, means for presenting said carrier with the pictures in direct view, and means acting on the carrier for flexing the same and thereby propagating across the surface of picture presentation a progressive substitution of one picture for another with complementary material portions of both pictures involved in the substitution contiguous to the shifting zone of picture flexures and in proper relation.

3. In a display device of the class described, a carrier having a series of pictures thereon representing successive phases of an action, means for presenting said carrier with the pictures in direct view, and means for progressively flexing one of said pictures away from the normal surface of picture presentation and for simultaneously flexing the picture representing the next phase of the action into the surface of picture presentation, while simultaneously displaying contiguous to the shifting zone of picture flexures, complementary portions of both pictures in proper relation.

4. In a display device of the class described, an endless carrier having a series of pictures thereon representing successive phases of an action, with the arrangement of the pictures of the series differing from the chronological order of the phases, means for presenting a portion of said carrier along the perimeter of a substantially closed surface, and means for actuating the carrier to bring about a number of phase changes, the arrangement of the pictures on the carrier being such as to render the number of phase changes in the action independent of any fixed relation between the perimeter of the surface of presentation and the picture spacings.

5. In a display device, a carrier having a series of pictures thereon representing successive phases of an action, means for presenting said carrier with only a portion thereof exposed to view, and means for withdrawing from view a picture on said carrier and substituting for it a previously concealed picture representing the next phase of the action, the said withdrawal and the said substitution being carried out while presenting contiguous exposed portions of chronologically succeeding pictures in proper complementary relation to give the effect of a substantially complete picture.

6. In a display device, a carrier having a series of pictures thereon representing successive phases of an action, with the arrangement of the pictures in the series differing from the chronological order of the phases, means for presenting said carrier with only a portion thereof exposed to direct view, and means for progressively withdrawing from view portions of a picture on said carrier, the said withdrawal being accompanied by a progressive presentation to view of corresponding portions of a previously concealed picture representing a phase of the action chronologically succeeding the phase represented by the picture being withdrawn.

7. In a display device, a surface of revolution having a slot therein, a carrier having pictures thereon arranged on the said surface and extending into said slot, and means for causing one picture on said carrier to pass through said slot out of view and another picture to emerge from said slot to take its place in view on the said surface while displaying complementary portions of both pictures on opposite sides of the slot.

8. In a device for the presentation of pictures in the form of a substantially closed surface, an endless carrier having a series of pictures thereon representing successive phases of an action, with the arrangement of the pictures of the series differing from the chronological order of the phases, whereby the number of phase changes in the action is rendered independent of any fixed relation between the perimeter of the surface of presentation and the picture spacings.

9. In a device for displaying animated pictures on a surface of revolution, an endless carrier having a series of pictures thereon, pictures representing succeeding phases of action being spaced apart a distance on said carrier substantially equal to the difference between the length of the carrier and the perimeter of the surface of revolution divided by some integral number.

10. In a display device, a carrier having a series of pictures thereon depicting successive phases of an action, means for presenting said carrier with only a portion thereof exposed to view, and means acting on the carrier for progressively flexing from a stationary condition a picture on said carrier, the said flexure being accompanied by a progressive flexure into a stationary condition of corresponding portions of a previously concealed picture until the next phase of the action is fully represented, whereupon the next adjacent picture on the carrier is flexed in the same manner.

11. In a display device of the class described, a carrier having a series of pictures thereon showing successive phases of an action, means for supporting said carrier with complementary portions of a pair of pictures representing successive phases of the action in proper contiguous relation, and means acting on the carrier for shifting along said carrier the zone of contiguity between complementary portions of successive pairs of pictures.

12. In a display device of the class described, a carrier having a series of pictures thereon showing successive phases of an action, means for presenting a portion of said carrier to direct view in a stationary condition, means acting on the carrier for flexing a portion thereof to progressively withdraw from a stationary condition a picture thereon, and means for flexing another portion of the carrier to progressively present into a stationary condition corresponding portions of a previously concealed picture representing the next phase of the action, the said flexures of the carrier being accomplished simultaneously and effecting the pictures involved to a like degree.

13. As a display device, a carrier having a series of pictures thereon showing successive phases of an action, the numerical arrangement of the pictures differing from the chronological order of the phases and the arrangement being such that when the carrier is joined at its ends each picture is spaced uniformly from the picture preceding and succeeding it in phase relation, as measured in a given direction along the carrier.

14. As a display device, an endless carrier bearing a series of portrayals depicting successive phases of an action when displayed in a sequence differing from their numerical order on the carrier, the portrayals being uniformly spaced with reference to the phase sequence, as measured in a given direction along the carrier.

15. In a display device, an endless carrier having a series of pictures thereon showing successive phases of an action, and means for supporting said carrier with portions thereof flexed away from the normal surface of presentation, whereby complementary portions of two pictures showing successive phases may be simultaneously displayed in proper relation on opposite sides of the zone of picture flexures.

16. In an animated display device for causing the presentation of a series of pictures representing successive phases of an action, means for supporting said pictures with portions thereof deflected away from the normal surface of presentation, and means for bringing about the substitution of one picture for another by deflecting chronologically succeeding pictures into and out of a substantially stationary condition in the surface of presentation, with the minimum distance between deflected picture portions less than the width of one picture.

17. In an animated display device for causing the presentation of a series of pictures representing successive phases of an action, means for bringing about the substitution of one picture for another by simultaneously deflecting chronologically succeeding pictures into and out of a substantially stationary condition in the surface of presentation with the deflected picture portions occupying a relatively narrow zone in the surface of presentation, and means for propagating the zone of picture deflections in an endless path.

18. The method of producing the effect of motion by means of a carrier having a series of pictures thereon representing successive phases of an action, which consists in presenting the carrier with portions thereof deflected away from the normal surface of presentation, and then bringing about the progressive replacement of any picture of the series by the picture representing the chronologically succeeding phase of the series by simultaneously deflecting the pictures involved in the replacement into and out of a substantially stationary condition in the surface of presentation.

19. The method of producing the effect of motion by means of a carrier having a series of pictures thereon representing successive phases of an action, with the numerical arrangement of the pictures differing from the phase sequence, which consists in presenting the carrier with only a portion exposed to view and then withdrawing from view a picture on said carrier and substituting for it a previously concealed picture representing the chronologically succeeding phase of the action, while simultaneously displaying contiguous portions of both pictures in such relation as to give the effect of a single picture.

Dated this 17th day of November, 1922.

JOHN T. BEECHLYN.